(No Model.) 2 Sheets—Sheet 1.
T. WICKERSHAM.
APPARATUS FOR SPRINKLING VINES AND PLANTS.
No. 364,790. Patented June 14, 1887.
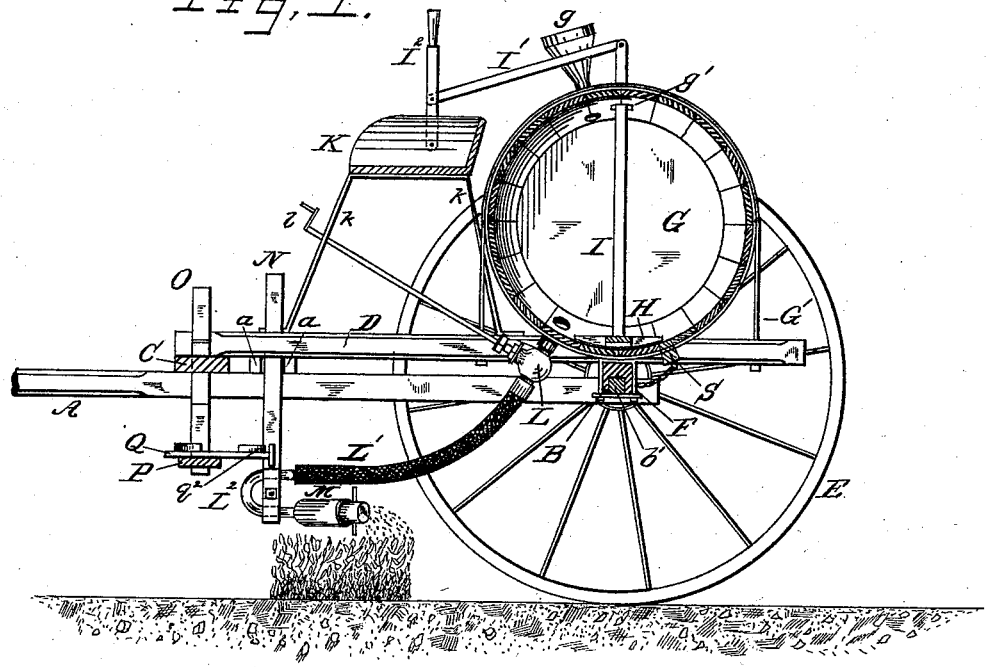
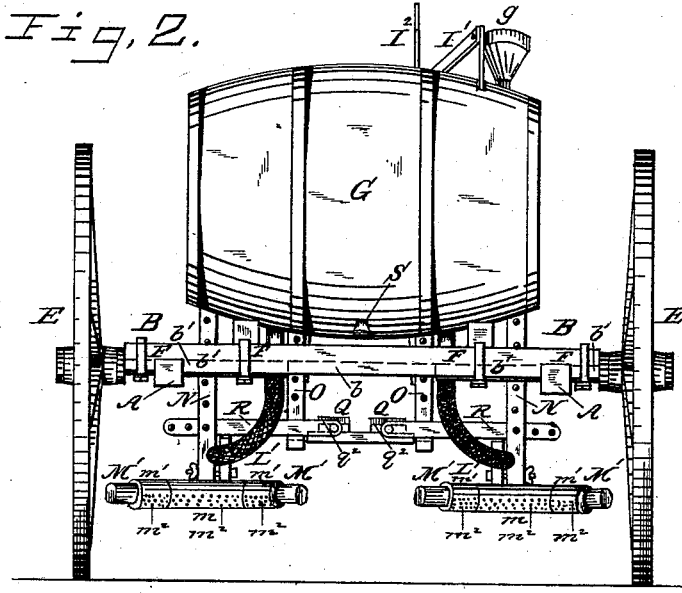
Witnesses
Wm. F. Huntemann
Jos. A. Ryan
Inventor
Townsend Wickersham
By his Attorneys
Whittlesey & Wright (No Model.) 2 Sheets—Sheet 2.
T. WICKERSHAM.
APPARATUS FOR SPRINKLING VINES AND PLANTS.
No. 364,790. Patented June 14, 1887.
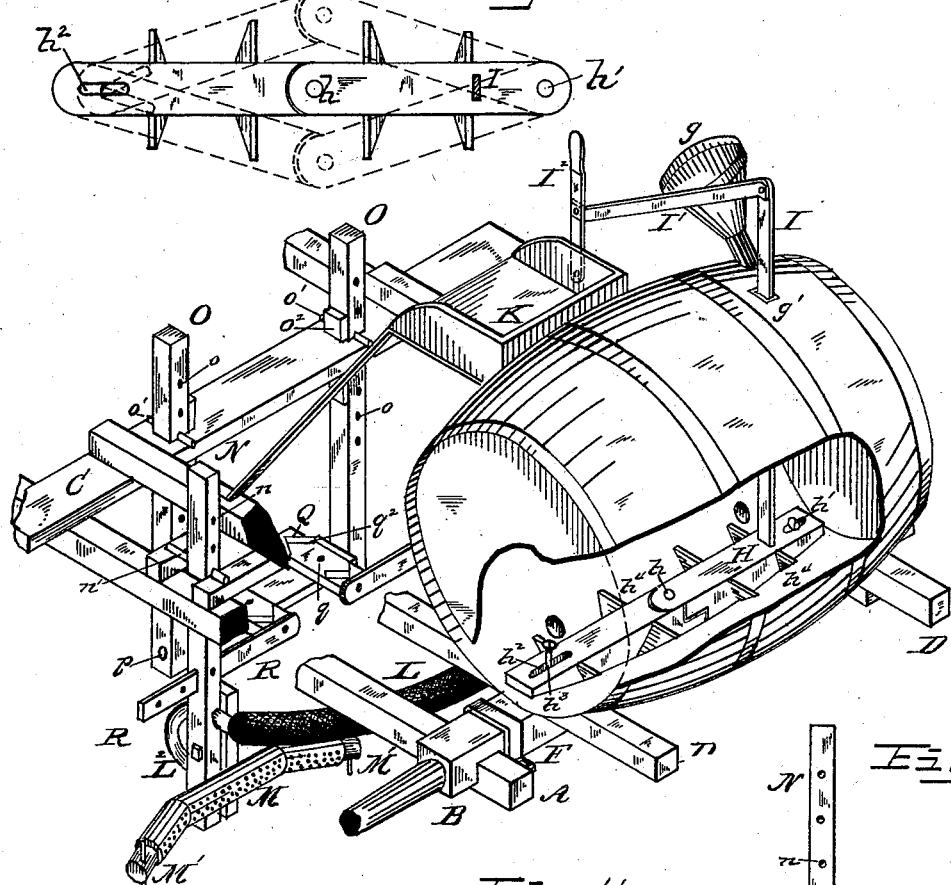
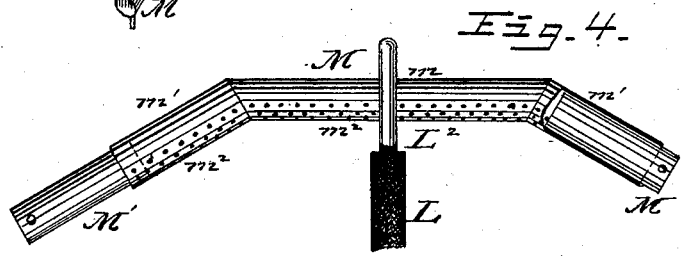
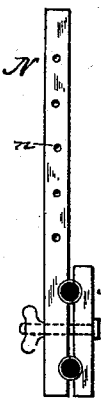
Witnesses
Wm. F. Huntemann
Jos. A. Ryan
Inventor
Townsend Wickersham
By his Attorneys.
Whittlesey & Wright

UNITED STATES PATENT OFFICE.

TOWNSEND WICKERSHAM, OF NEW GARDEN, PENNSYLVANIA.

APPARATUS FOR SPRINKLING VINES AND PLANTS.

SPECIFICATION forming part of Letters Patent No. 364,790, dated June 14, 1887.

Application filed September 29, 1886. Serial No. 214,852. (No model.)

*To all whom it may concern:*

Be it known that I, TOWNSEND WICKERSHAM, a citizen of the United States, residing at New Garden, Chester county, Pennsylvania, have invented certain new and useful Improvements in Apparatus for Sprinkling Vines and Plants, of which the following is a full, clear, and exact specification.

This invention relates to contrivances for sprinkling potato-vines, tomato-plants, and other vegetation with liquid, which may be either water, for the purpose of irrigation, or a solution of some poison—such as paris-green or London purple—for the purpose of destroying potato-bugs or other insects.

The object of the invention is to enable the liquid to be applied more rapidly and with less labor than when the sprinkling is done by hand; and to this end my invention consists in certain combinations and arrangements of parts, hereinafter described, and particularly pointed out in the claims.

In the accompanying drawings, forming part of this specification, Figure 1 is a longitudinal sectional elevation of a sprinkling-cart embodying my improvements. Fig. 2 is a rear view of the same. Fig. 3 is a perspective view, certain parts being broken away to better show the construction. Fig. 4 is an enlarged plan view of one of the sprinklers. Fig. 5 is a front view of one of the hangers. Fig. 6 is a detail view showing the movements of the stirrer.

Similar letters of reference indicate corresponding parts in all the views.

My invention is adapted to sprinkle two rows of plants at once as it is drawn across the field, being provided with a seat for the driver, and suitable handles and treadles by means of which he can control and direct the spray.

The frame-work of the apparatus is composed of the thills A, the axle-bed B, and the cross-bar C, which are firmly fastened together. The skids D rest upon and are bolted to the cross-bar C and axle-bed B. This frame-work is supported upon a pair of wheels, E. Since the rows of vines are not always planted the same distance apart, the axle is made adjustable in length, so that the wheels may be set to run between the rows. A groove, $b$, is cut the entire length of the axle-bed B, and two iron axle-bars, $b'$ $b'$, are embedded in this groove. The axle-bars may be drawn out or pushed in to set the wheels at any desired distance apart, in which position they may be held by tightening up the clips F. The skids D support the liquid receptacle or tank G, which is preferably a barrel, as shown. The tank is held down by two or more bands of iron, G', passing over it and secured to the skids D, and is provided with a funnel, $g$, through which the liquid and the poison may be introduced. At the bottom of the tank is the stirrer or agitator H, for agitating the liquid and keeping it thoroughly mixed with the paris-green, London purple, or other poison. The stirrer H consists of two pieces of wood placed end to end and jointed together at $h$, as shown, and extending nearly the whole length of the barrel G. On the under side they are shaped to conform to the curvature of the barrel. One end of the stirrer H is pivoted to the barrel at $h'$. The other end is pivotally secured by means of a slot, $h^2$, through which passes a bolt, $h^3$.

Extending from each side of the stirrer are vanes $h^4$, which are preferably set at an angle, as shown, in order to agitate the liquid more effectually. Near the pivot $h'$ is attached an arm, I, which passes up through a slot, $g'$, in the upper side of the barrel G, and is connected by a rod, I', with the lever $I^2$, fulcrumed on the driver's seat K, or at any other convenient point. The seat K is supported on braces $k$, rising from the frame-work of the apparatus. The arm I has a loose bearing in the slot $g'$, so that it can be vibrated back and forth by means of the lever $I^2$, the edges of the slot acting as a fulcrum for the arm I. The movement of the lower end of the arm imparts to the stirrer a peculiar lateral motion, illustrated by Fig. 6. The ends of the stirrer being pivoted to the barrel, each half of the stirrer must vibrate on its pivot; but as the two halves are jointed together at $h$, the slot $h^2$ is necessary in order to allow for the endwise play of the parts when swung from side to side. This motion of the stirrer produces currents in the liquid, which prevent the poisonous ingredient from settling to the bottom of the barrel, or quickly stir it up in case it has collected there.

Within easy reach of the driver are two handles, $l\ l$, which control the two stop-cocks, L L. These stop-cocks are inserted into the barrel G a little above the lowest point of its bottom, as shown, so as not to become clogged with sediment when the apparatus is not in use. Attached to each stop-cock is a flexible tube, L′, the other end of which is slipped over the curved neck $L^2$ of the sprinkler M. A notched bar, N′, and a bolt, $N^2$, clamp the curved neck $L^2$ to the hanger N.

Each sprinkler M, of which there are preferably two, consists of a metallic tube open at each end, and connecting with the neck $L^2$ at about the center of its length. It is preferably composed of three sections, $m'\ m\ m'$, the end sections, $m'$, being placed at a slight angle to the middle one, $m$, as shown, in order to render the sheet of spray fan-shaped. Along the rear side of the sprinkler are provided perforations $m^2$ for the escape of the liquid. A long plug or stopper, M′, is fitted into each of the end sections, and by sliding them out or in a greater or less number of perforations are opened, and the width of the spray is regulated. The hangers N are suspended by means of a pin or bolt, $n'$, between two blocks, $a\ a$, fastened to the thills A and skids D. A row of holes, $n$, in each hanger enables it to be vertically adjusted to suit the height of the plants. The hanger can swing freely on its pin $n'$ in a plane transverse to the row of plants.

As it frequently happens that the row of plants is crooked and sinuous, it is important that some means be provided whereby the sprinkler M can be moved laterally, in order that the spray may be at all times directed full upon the vines. Furthermore, owing to this irregularity in the rows of vines, the distance between the rows is not always the same, and it becomes necessary to make each sprinkler independently movable, in order that each may follow the variations of the row which it is treating. I accomplish this result in the following manner: In the cross-bar C are two hangers, O, rendered vertically adjustable by perforations $o$, pins $o'$, and wedges $o^2$, so that they can be raised or lowered to suit the length of the driver's legs. In the lower ends of these hangers is journaled the bar P, which rocks freely upon its trunnions $p$. The bar P carries two foot-rests or treadles, Q, which are pivoted to the bar P at $q$, so as to be capable of lateral movement. Each treadle is provided with ledges or cleats $q^2$, to receive the foot of the driver and enable him to vibrate the treadles by a twist of his ankle. The rear end of each treadle is connected by the adjustable rod R with its adjacent sprinkler-hanger N. By moving his heels the driver can thus alter the position of either or both of the sprinklers at will and direct the spray upon the plants irrespective of the irregularity of the rows or the deviations of the apparatus from its proper course.

It will be seen that the arrangement of the sprinklers is such that the spray is in full view of the driver, who can note any changes in color indicative of a weakening of the solution, and restore it to the proper strength either by stirring up the mixture or by introducing fresh supplies of poison into the tank.

The contents of the tank may be drawn off, when desired, by removing the plug S from an opening in the bottom.

Having thus described my invention, what I claim, and desire to secure by Letters Patent, is—

1. In a sprinkling-cart, the combination, with the tank G, of the stirrer H, composed of two parts placed end to end and jointed together, the ends of the stirrer thus formed being pivotally secured to the tank by means of the pivots $h'\ h^3$ and the slot $h^2$, and means for imparting a lateral swinging motion to the stirrer, substantially as and for the purpose set forth.

2. The combination, with the tank G, of the stirrer H, composed of two parts jointed together and provided with vanes $h^4$, slot $h^2$, pivots $h'\ h^3$, and a suitable handle for operating the stirrer, substantially as and for the purpose set forth.

3. The combination, with the tank G, of the two-part jointed stirrer H, having the slot $h^2$ and vanes $h^4$, the pivots $h'\ h^3$, and the arm I, connecting-rod, and handle, substantially as and for the purpose set forth.

4. The combination, with the barrel G, having the slot $g'$, of the stirrer H, composed of two parts placed end to end and jointed together, having slot $h^2$, pivots $h'\ h^3$, arm I, rod I′, and lever $I^2$, substantially as and for the purpose set forth.

5. In a sprinkling-cart, the combination, with a tank for the liquid, of two sprinklers independently movable in a direction transverse to the rows of plants, each sprinkler being provided with its own separate and individual lever, whereby the driver can move said sprinkler at will while the apparatus is in motion without affecting the operation of the other sprinkler, in order that each sprinkler may be caused to follow the variations in the row of plants which it is treating, substantially as and for the purpose set forth.

6. In a sprinkling-cart, the combination, with two vertically-adjustable and laterally-movable sprinklers, of two vertically-adjustable and laterally-movable treadles, each movable independently of the other, and each connected with its adjacent sprinkler, substantially as and for the purpose set forth.

7. The combination, with the sprinklers M, of the vertically-adjustable swinging hangers N, the vertically-adjustable hangers O, the cross-bar P, treadles Q, and connecting-rods R, substantially as and for the purpose set forth.

8. The combination, with the frame of a sprinkling-cart, of a hanger, N, suspended from said frame and provided with a bar, N', and bolt N², and a sprinkler, M, having a curved neck, L², clamped between the hanger N and bar N', substantially as and for the purpose set forth.

In witness whereof I have hereunto set my hand in the presence of two witnesses.

TOWNSEND WICKERSHAM.

Witnesses:
EDW. P. CLOUD,
WILLIAM W. POLK.